2,856,427
Patented Oct. 14, 1958

2,856,427

SUBSTITUTED GLYCINAMIDES

William F. Bruce, Havertown, and Joseph Seifter, Berwyn, Pa., assignors to American Home Products Corporation, New York, N. Y., a corporation of Delaware No Drawing. Application April 25, 1956
Serial No. 580,453

4 Claims. (Cl. 260—561)

This invention relates to new substituted glycinamides having the general formula

RNHCH$_2$CONR'R'' wherein R stands for selected aliphatic radicals while R' and R'' represent alkyl radicals.

The compounds of the invention are useful intermediates in the preparation of bis-acetamides which have been found to possess a local anesthetic action considered valuable for medicinal use. Additionally, the compounds falling within the scope of the invention demonstrate a spasmolytic action similar in type to papaverine.

The compounds of the invention may be prepared by first reacting chloracetyl chloride with a dialkylamine, R'R''NH, where R' and R'' represent straight or branched-chain alkyl radicals having from 4 to 6 carbon atoms. The reaction is carried out in the presence of benzene or ether as a solvent for the reactants. Heating may or may not be necessary depending on the speed of the particular reaction. The chloracetamide thus produced remains in solution in the solvent and is obtained by distilling off the solvent under reduced pressure. In general, a molar ratio of chloride to amine of about 1:2 is preferred for the reaction.

The chloracetamide thus prepared, or secured from other sources, is now reacted with an aliphatic primary amine, designated by the formula RNH$_2$, wherein R stands for a hydroxy-substituted alkyl of 2 to 4 carbon atoms.

The reaction of the appropriate chloracetamide and the appropriate primary amine to form the desired substituted glycinamide is preferably operated with a molar ratio, amide to amine of about 1:1 and is carried out in the presence of a solvent for the reactants such as alcohols having 4 to 7 carbon atoms in the molecule, dioxane or hydrocarbon solvents such as xylene. The reaction is carried out in the presence of an acid acceptor or mildly basic material such as alkali or alkaline earth metal carbonates, sodium bicarbonate or alkali metal alcoholates and preferably about 2 to 3 mols of this material is used. The reaction operation is set up for refluxing and the reaction temperature is the refluxing temperature of the particular solvent selected. Generally, a reaction or refluxing time of about 10–15 hours is sufficient for complete reaction. In the event that solids are formed these are removed by filtration, the substituted glycinamide product remaining in solution in the solvent. The solvent is finally removed by distillation at low pressures to obtain the desired product.

In preparing bis-acetamides, the same procedure is used as described in the preceding paragraph for making the compounds of the invention, utilizing an appropriate chloracetamide but using in place of the primary amine one of the acetamides of the invention. The reaction may be illustrated as follows:

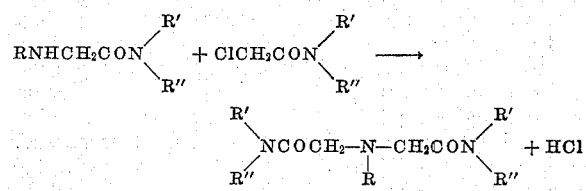

Proceeding to a better understanding of the invention, illustrative specific procedures for the preparation of representative compounds falling within the scope of the invention are set forth in the following examples.

EXAMPLE 1

Preparation of alpha-(2-hydroxyethylamino)-N,N-di-n-amyl acetamide

To a solution of 45 grams of di-n-amylamine in 2000 cc. of ether a solution of 19 grams (13 cc.) of chloracetyl chloride in 250 cc. of ether was added dropwise. The temperature of the reaction was maintained at 10 to 20° C. by means of an ice bath. Upon completion of the reaction, the precipitate of di-n-amylamine hydrochloride was filtered off, the ether evaporated from the filtrate, and the residual oil distilled at 198 to 200° C. under vacuum of 58 mm. The N,N-di-n-amyl-alpha-chloracetamide solidified in the receiving flask and amounted to 38 grams.

ANALYSIS

|  | Carbon | Hydrogen |
| --- | --- | --- |
| Calculated for C$_{12}$H$_{24}$NOCl | 61.7 | 10.28 |
| Found | 61.58 | 10.49 |

A solution of 2.4 grams of monoethanol amine and 10 grams of N,N-di-n-amyl-alpha-chloracetamide in 25 cc. of n-butanol together with 4 grams of sodium carbonate was refluxed for 15 hours. The product was washed with water, dried and distilled. The compound boiled at 200–210° C. at a pressure of 5 mm. The yield of alpha-(2-hydroxyethylamino)-N,N-di-n-amyl acetamide, a colorless viscous oil, was 6 grams.

EXAMPLE 2

Preparation of alpha-(1,1-dimethyl-2-hydroxyethylamino)-N,N-di-n-amyl acetamide

To 500 cc. of n-butyl alcohol contained in a one liter flask, fitted with a mechanical stirrer, reflux condenser and thermometer, was added 33 grams of 2-amino-2-methyl-1-propanol, 85 grams of chloro-N,N-di-n-amyl acetamide and 200 grams of sodium carbonate. The reaction mixture was heated at 100° C. overnight. It was then cooled and water added to dissolve the inorganic salts. The two layers were separated. The water layer was extracted with n-butyl alcohol and the extract added to the organic layer. The organic layer was concentrated and the residue taken up in benzene. It was washed with water and dried over magnesium sulfate. The benzene was distilled off and the product fractionated. B. P. 170–171° C. at 0.75 mm. Yield: 26 grams $N_D^{20}=1.4672$.

EXAMPLE 3

*Preparation of alpha-(1-methyl-2-hydroxyethylamino)-N,N-di-n-amyl acetamide*

To 500 cc. of n-butyl alcohol contained in a one liter flask, fitted with a reflux condenser, mechanical stirrer and thermometer, was added 28 grams of mono-isopropanol amine, 85 grams of chloro-N,N-di-n-amyl acetamide and 200 grams of sodium carbonate. The reaction mixture was heated at 100° C. overnight. The inorganic salts were filtered off when reaction cooled. The salts were washed with n-butyl alcohol and the washings added to the filtrate. The filtrate was washed with water and concentrated. On distilling residue a solid separated out, so that the residue had to be taken up in benzene and washed with water. The benzene solution was dried over magnesium sulfate and concentrated. Product fractionated, B. P. 150° at 1 mm. Yield: 23.5 grams $N_D^{20}=1.4713$. *Analysis.*—N, calculated 10.29. Found 10.12.

EXAMPLE 4

*Preparation of alpha-(N-beta-hydroxyethylamino)-N,N-di-n-butyl acetamide*

To 500 cc. of n-butyl alcohol contained in a liter flask fitted with a mechanical stirrer and a reflux condenser was added 7 grams of ethanolamine, 20.5 grams of chloro-N,N-di-n-butyl acetamide and 50 grams of sodium carbonate. The above mixture was refluxed overnight. It was filtered hot to remove the inorganic salts. The salts were washed with n-butyl alcohol and the washings added to the filtrate. The filtrate was washed with sodium carbonate solution until no halogen could be detected by the Beilstein test. The alcohol was distilled off under vacuum, and the product fractionated. B. P. 180–183° C. at 2.5 mm.

EXAMPLE 5

*Preparation of alpha-(N-beta-hydroxyethylamino)-N,N-di-isobutyl acetamide*

To 500 cc. of n-butyl alcohol contained in a one liter flask, fitted with a mechanical stirrer and reflux condenser, were added 14 grams of ethanolamine, 41 grams of chloro-N,N-di-isobutyl acetamide and 100 grams of sodium carbonate. The reaction mixture was refluxed overnight. It was filtered hot to remove the inorganic salts. The salts were washed with n-butyl alcohol and the washings added to the filtrate. The filtrate was washed with 10% sodium carbonate until no halogen could be detected by the Beilstein test. The alcohol was distilled off under vacuum. The product was fractionated. B. P. 166–168° C. at 1.3 mm. *Analysis.*—N, calculated 12.17. Found 11.53; 11.29.

EXAMPLE 6

*Preparation of alpha-(N-beta-hydroxyethylamino)-N,N-di-n-hexyl acetamide*

To 400 cc. of n-butyl alcohol contained in a one liter flask, fitted with a mechanical stirrer and a reflux condenser, were added 7 grams of ethanolamine, 26 grams of chloro-N,N-di-n-hexyl-acetamide and 50 grams of sodium carbonate. The reaction mixture was refluxed overnight. It was filtered hot to remove the inorganic salts. The salts were washed with n-butyl alcohol and the washings added to the filtrate. The filtrate was washed with 10% sodium carbonate until no halogen could be detected by the Beilstein test. The alcohol was distilled off under vacuum. The product was fractionated. B. P. 210–212° C. at 1.5 mm. *Analysis.*—N, calculated 9.79. Found 9.1.

Substantially all of the products of the invention are high boiling basic liquids of limited solubility. It is contemplated that while the products may be used in this basic form, it is within the scope of this invention that they may be prepared and used in the form of their acid-addition salts. The preparation of an acid-addition salt is well-known and generally involves the addition of the selected acid to an ether, alcohol or water solution of the basic material. The acid is chosen to yield a salt which is known to those skilled in the art as being physiologically non-toxic. As examples, the hydrochloride, sulfate or tartrate salts of the products may be used.

Many modifications of the invention will be apparent to those skilled in the art without departure therefrom or from the scope of the claims, and since the foregoing disclosure has been given by way of example for clearness and understanding only, no unnecessary limitations should be understood and the appended claims should be construed as broadly as the state of the art permits.

This application is a continuation-in-part of application Serial No. 201,239, filed December 16, 1950, which in turn is a continuation-in-part of application Serial No. 673,154, filed May 29, 1946, both applications being now abandoned.

We claim:

1. As a new compound, alpha-(2-hydroxyethylamino)-N,N-di-butyl acetamide.
2. As a new compound, alpha-(1-methyl-2-hydroxyethylamino)-N,N-di-n-amyl acetamide.
3. As a new compound, alpha-(2-hydroxyethylamino)-N,N-di-hexyl acetamide.
4. As a new compound, alpha-(2-hydroxyethylamino)-N,N-di-n-amyl acetamide.

References Cited in the file of this patent

UNITED STATES PATENTS

| | | |
|---|---|---|
| 2,368,208 | Epstein | Jan. 30, 1945 |
| 2,580,411 | Cusic | Jan. 1, 1952 |